United States Patent
Nakayama et al.

(10) Patent No.: US 10,701,224 B2
(45) Date of Patent: Jun. 30, 2020

(54) IMAGE FORMING APPARATUS HAVING AN OPERATION PORTION WITH A NEAR FIELD COMMUNICATION PORTION

(71) Applicant: CANON KABUSHIKI KAISHA, Tokyo (JP)

(72) Inventors: Yoshiyuki Nakayama, Toride (JP); Ryoichi Kawasumi, Toride (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 16/509,977

(22) Filed: Jul. 12, 2019

(65) Prior Publication Data
US 2019/0335046 A1    Oct. 31, 2019

Related U.S. Application Data

(62) Division of application No. 16/152,872, filed on Oct. 5, 2018, now Pat. No. 10,530,944, which is a division of application No. 15/491,097, filed on Apr. 19, 2017, now Pat. No. 10,148,833.

(30) Foreign Application Priority Data

Apr. 25, 2016   (JP) ................. 2016-087223

(51) Int. Cl.
*G06F 3/12*      (2006.01)
*H04N 1/00*      (2006.01)

(52) U.S. Cl.
CPC ..... *H04N 1/00496* (2013.01); *H04N 1/00307* (2013.01); *H04N 1/00411* (2013.01); *H04N 2201/006* (2013.01); *H04N 2201/0094* (2013.01)

(58) Field of Classification Search
None
See application file for complete search history.

(56) References Cited

U.S. PATENT DOCUMENTS

| | | | |
|---|---|---|---|
| 2014/0253949 A1* | 9/2014 | Tsujimoto | H04N 1/0084 358/1.14 |
| 2016/0191730 A1* | 6/2016 | Ohata | H04N 1/00307 358/1.15 |
| 2016/0211888 A1* | 7/2016 | Funakawa | H04B 5/0093 |
| 2017/0374213 A1* | 12/2017 | Sawada | H04N 1/00315 |

FOREIGN PATENT DOCUMENTS

JP   2015-179311 A   10/2015

* cited by examiner

*Primary Examiner* — Henok Shiferaw
(74) *Attorney, Agent, or Firm* — Venable LLP

(57) ABSTRACT

Provided is an input device comprising: a touch panel which receives an operation from a user; an external member having an external surface substantially the same as a surface of the touch panel; and a near field communication unit which is provided near the surrounding of the touch panel and inside of the external member and performs communication with an object to be detected which is brought close to a detection range, wherein a position corresponding to the near field communication unit of the external member projects from the touch panel and is inclined such that the side close to the touch panel is higher than the side distant from the touch panel.

9 Claims, 12 Drawing Sheets

IMAGE FORMING APPARATUS HAVING AN OPERATION PORTION WITH A NEAR FIELD COMMUNICATION PORTION

BACKGROUND OF THE INVENTION

Field of the Invention

The present invention relates to an input device, and an image forming apparatus such as a facsimile, a copying machine, or a multi-function peripheral (MFP).

Description of the Related Art

Recently, an operation portion provided with a touch panel has been increasingly applied as an input device of an image forming apparatus. Such an operation portion has spread to a compact image forming apparatus which outputs an A4 sheet and expected to be placed on a desk, as well as an image forming apparatus that outputs an A3 sheet.

In addition, a recent trend has been directed to a flat design in which a step (except for various buttons and keys) on the surface of the operation portion is eliminated to make the surface of the touch panel and a cover surface of the operation portion flush with each other without having a height difference on the boundary.

There are a variety of types of touch panels, and resistive (pressure-sensitive) touch panels are conventionally the mainstream. However, the changeover to capacitance touch panels, which are operable by lighter touch in response to an electric signal from a person's hand, has been progressing. Touch panels of these types have merits and demerits. Each of these types is used for each case at present. For example, when priority is placed on cost, resistive touch panels are used, and when priority is placed on an operational feeling, capacitance touch panels are used.

In addition, near field communication (abbreviated to NFC in general) has been increasingly mounted as a recent technology. This technology enables a variety of authentications from a mobile device such as a smartphone or a tablet, or enables a printing output operation of an image forming apparatus from a mobile device. A target surface that a user faces a mobile device for the NFC is often placed near a touch panel from the viewpoint of accessibility and easy recognition of input information from the mobile device.

Japanese Patent Laid-Open No. 2015-179311 discloses a technology in which a target for the NFC and a touch panel are placed on the same plane, and an NFC unit performs a process according to received information while invalidates an operation received by the touch panel.

However, the configuration disclosed in Japanese Patent Laid-Open No. 2015-179311 entails a problem such that, when the mobile device is held over a target section for NFC detection, the end of the mobile device or the hand or fingers holding the mobile device might be in touch with the touch panel, causing an operation which is not intended by the user.

According to the present invention, it is desirable to prevent accidental misoperation on the touch panel caused by the contact with the mobile device or the hand of the user holding the mobile device during the communication with the mobile device through near field communication.

SUMMARY OF THE INVENTION

An input device according to the present invention includes: a touch panel configured to receive an operation from a user; a detection surface configured to face a mobile device which is brought close to the input device and serves as an object to which near field communication is to be performed, wherein the detection surface is arranged adjacent to the touch panel so that the mobile device facing the detection surface overlaps the touch panel; and a near field communication unit configured to perform the near field communication with the mobile device facing the detection surface, wherein the detection surface is inclined with respect to a panel surface of the touch panel so that a distance between the mobile device, which faces the detection surface for performing the near field communication and overlaps the touch panel, and the touch panel is larger than a distance between the mobile device which faces the detection surface for performing the near field communication and the detection surface.

In addition, an input device according to the present invention includes: a touch panel configured to receive an operation from a user; a detection surface configured to face a mobile device which is brought close to the input device and serves as an object to which near field communication is to be performed, wherein the detection surface is arranged adjacent to the touch panel so that the mobile device facing the detection surface overlaps the touch panel; and a near field communication unit configured to perform the near field communication with the mobile device facing the detection surface, wherein the detection surface is inclined with respect to a panel surface of the touch panel so that a gap is formed between the mobile device, which is in contact with the detection surface while facing the detection surface, and overlaps the touch panel, and the panel surface of the touch panel.

Further features of the present invention will become apparent from the following description of exemplary embodiments with reference to the attached drawings.

DESCRIPTION OF THE EMBODIMENTS

Hereinafter, preferable embodiments of the present invention will be illustratively described in detail with reference to the drawings. Note that dimensions, materials, and shapes of the components described in the embodiments below and their relative position are to be changed, as appropriate, according to the configuration to which the present invention is to be applied and various conditions. Accordingly, it is not intended to limit the scope of the present invention only to those unless specifically described.

First Embodiment

Figure 1:
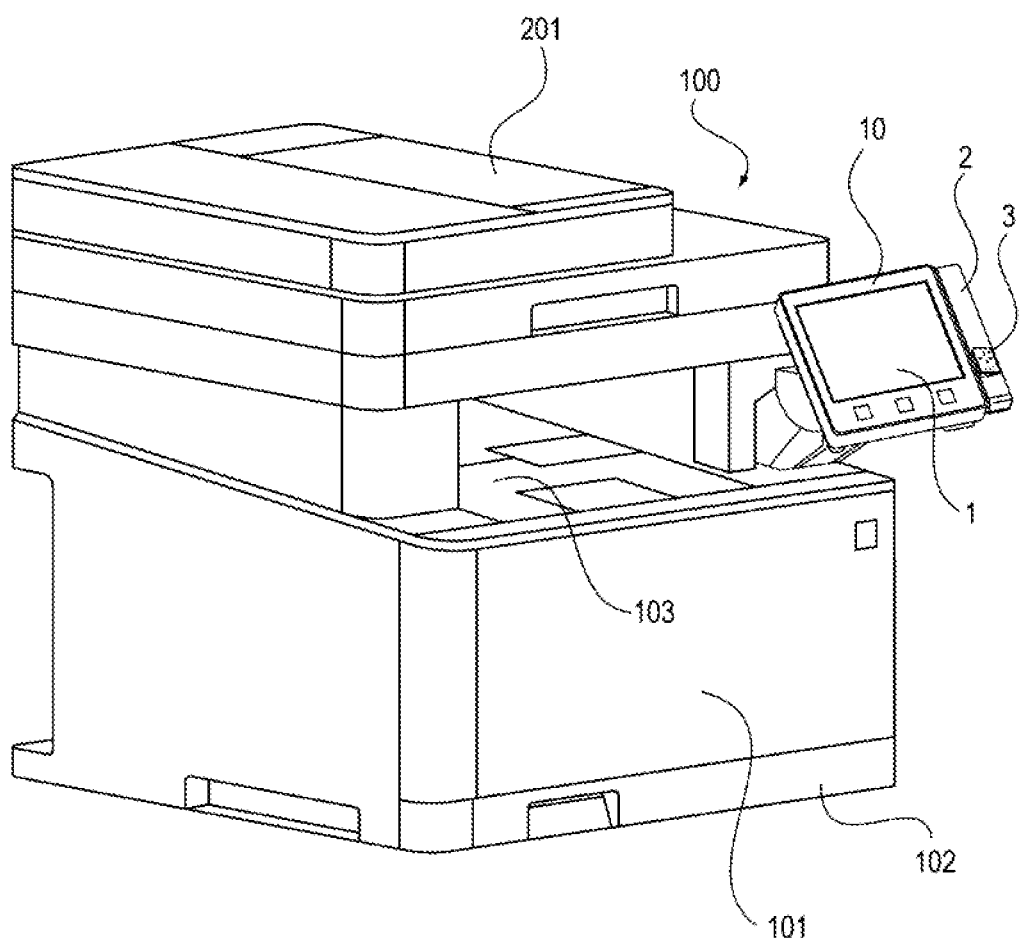
FIG. 1 is a perspective view of an outer appearance of an image forming apparatus according to a first embodiment.

An embodiment of an image forming apparatus including an input device according to the present invention will specifically be described with reference to the drawings. FIG. 1 is a perspective view of the image forming apparatus provided with an operation portion serving as an input device according to the first embodiment, and FIG. 2 is a side view of an outer appearance of the image forming apparatus provided with the operation portion.

Figure 2:
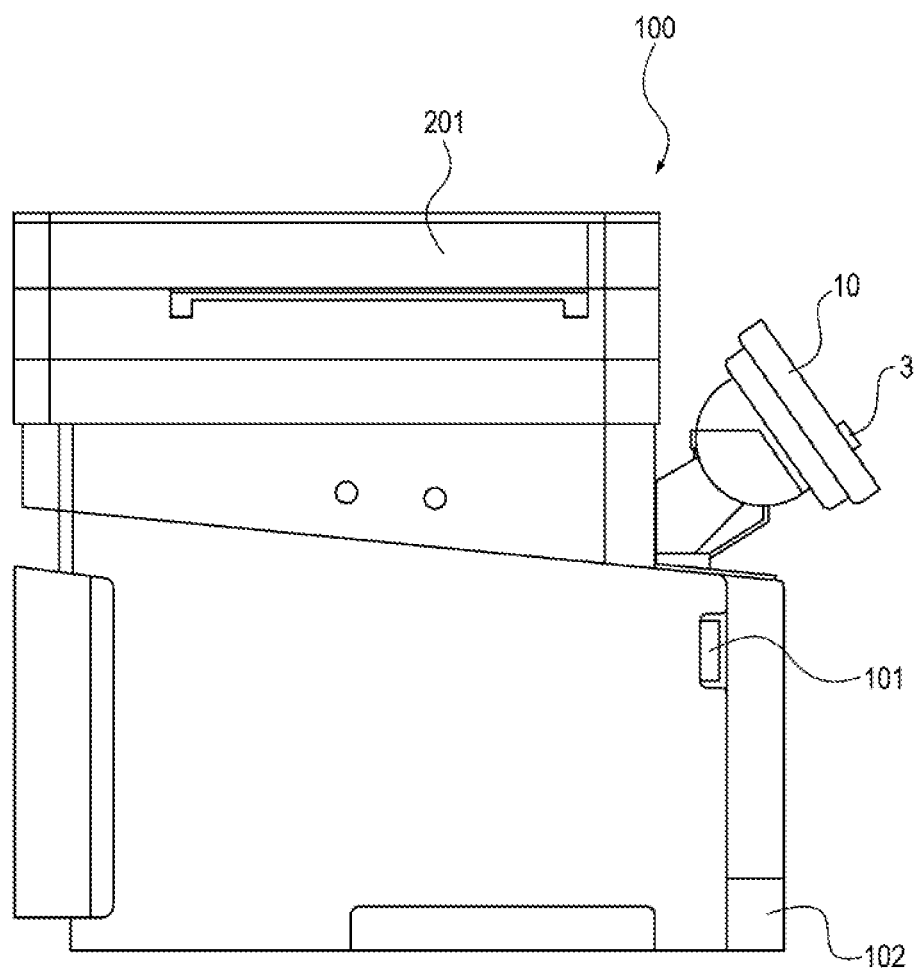
FIG. 2 is a side view of the outer appearance of the image forming apparatus according to the first embodiment.

In FIGS. 1 and 2, the image forming apparatus 100 includes an image forming apparatus main body 101 that forms an image onto a sheet, such as a recording sheet, on which an image is to be recorded, and an image reading apparatus 201 that is mounted above the image forming apparatus main body 101 to read an image of a sheet, such as an original, which is to be read. The image forming apparatus 100 also includes an operation portion 10 serving as the input device. The operation portion 10 has a touch panel 1 and a near field communication unit (generally abbreviated to NFC, and hereinafter referred to as NFC) 3. Herein, near field communication indicates a standard (International Standard: ISO/IEC 18092 or ISO/IEC 21481) for performing wireless communication by allowing a mobile device to be close to a target surface with a distance of about 10 cm.

In an image forming operation by the image forming apparatus 100, an image is firstly stored in the apparatus by the image reading apparatus 201 or an unillustrated image input device, such as a personal computer, connected to the apparatus main body. Next, a sheet on which an image is to be recorded is fed, one by one, from a sheet cassette 102 provided below the apparatus. The stored image is transferred onto the sheet by an image forming portion in the apparatus, and the sheet is outputted onto a sheet discharge tray 103.

In this case, various output conditions, such as the number of sheets to be outputted and an image size, are inputted through the operation portion 10, and the apparatus is controlled based on the inputted information. The operation portion 10 is generally provided above and in front of the apparatus, such as in front of the image reading apparatus 201, in most cases, in consideration of easy input. Now, the side where the operation portion 10 is provided is defined as a near side (front side) of the image forming apparatus, and the opposite side is defined as a far side (back side) of the apparatus. Further, one side in the width direction orthogonal to the near-far direction of the apparatus is defined as right, and the other side is defined as left, as viewed from the near side of the apparatus.

Figure 5:
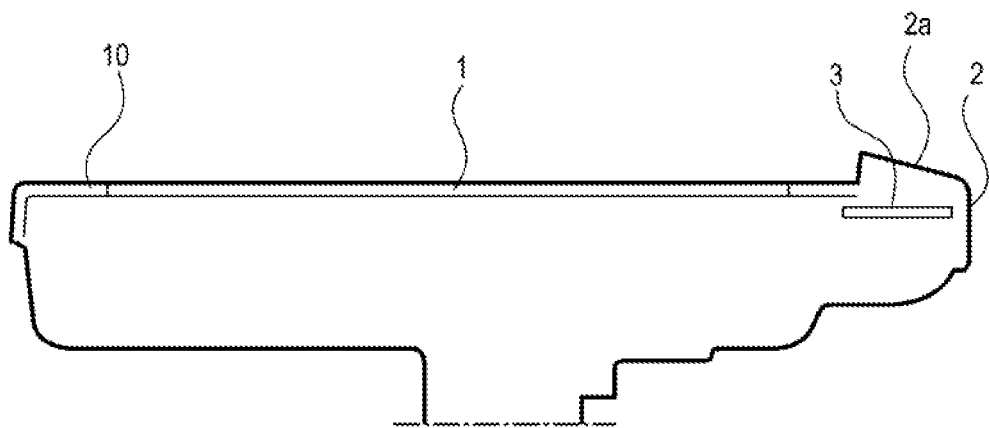
FIG. 5 is a sectional view of the operation portion according to the first embodiment.

In FIGS. 1 and 2, when a user touches a panel surface of the touch panel 1, information is inputted, and the touch panel 1 receives the operation from the user. A cover 2 serving as an external member has an external surface substantially the same as the surface of the touch panel 1. Specifically, the touch panel 1 is provided so that the surface thereof is substantially the same as the surface (external surface) of the cover 2 of the operation portion 10. As illustrated in FIG. 5, the NFC 3 communicates with an object to be detected, such as a mobile device, which is brought close to a detection range (communication distance). The NFC 3 is provided near the surrounding of the touch panel 1 and inside of the cover 2. A detection position (detection surface) 2a for the NFC 3 is a position corresponding to the NFC 3 provided inside of the cover 2. In the present embodiment, the cover 2 serves as an attachment which forms the detection position (detection surface) 2a.

Note that there are multiple types of the touch panel 1. There are roughly two types: a resistive (pressure-sensitive) touch panel that converts a physical contact on a panel surface into electric information; and a capacitance touch panel that detects a small electric signal from a hand or a finger touched on the panel surface. The capacitance touch panel has high sensitivity, and easy to respond to a detailed operation, so that it is considered to be a mainstream in the future. However, the capacitance touch panel is higher in cost than the resistive touch panel. Therefore, in the present embodiment, the resistive (pressure-sensitive) touch panel is employed.

The present embodiment shows the image forming apparatus handling A4 sheets. In the image forming apparatus 100, the widths and depths of the image forming apparatus main body 101 and the image reading apparatus 201 are substantially the same. The image forming apparatus 100 has the operation portion 10, which uses the touch panel 1 of a predetermined size (here, 5 inches), provided to project toward the front side of the apparatus from the main body. Since the operation portion 10 is provided to project from the main body, the operation portion 10 can be tilted on the spot, whereby a variety of users from tall users to users in wheelchairs can use the operation portion 10 always at an easy-to-see angle.

Figure 3:
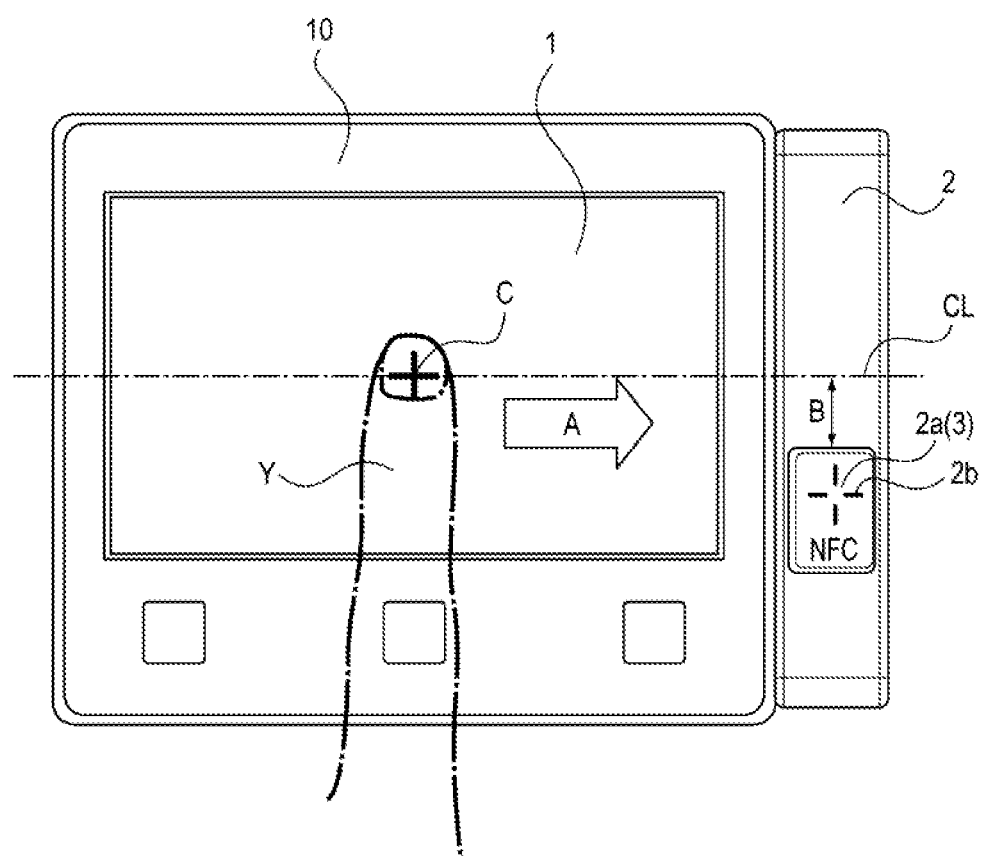
FIG. 3 is a front view of an outer appearance of an operation portion according to the first embodiment.
Figure 4:
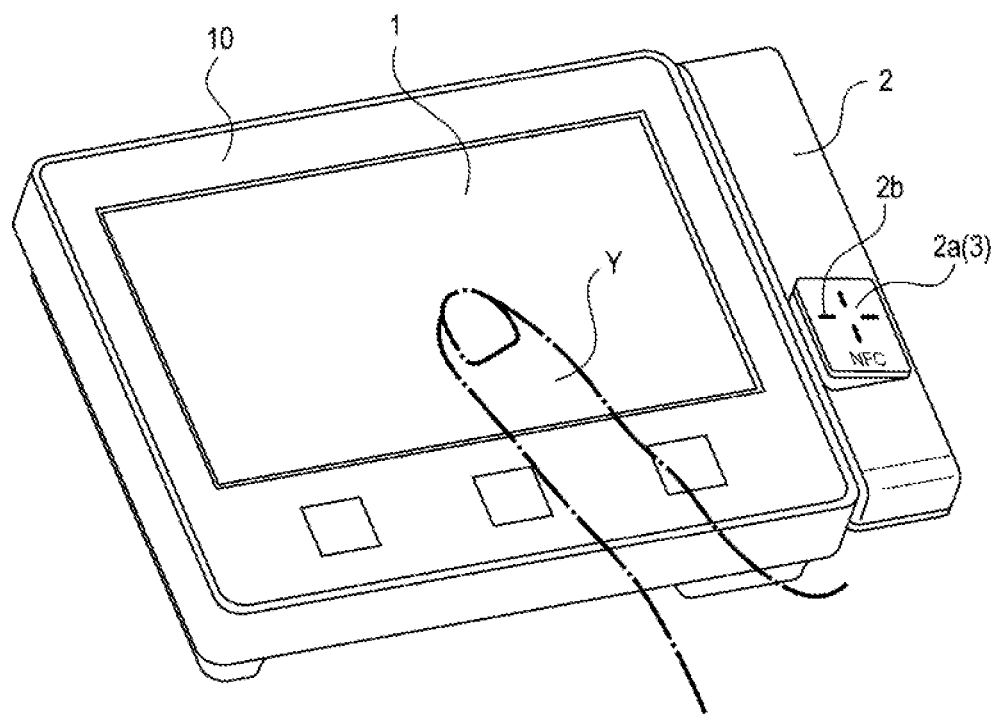
FIG. 4 is a perspective view of the outer appearance of the operation portion according to the first embodiment.
Figure 6A:
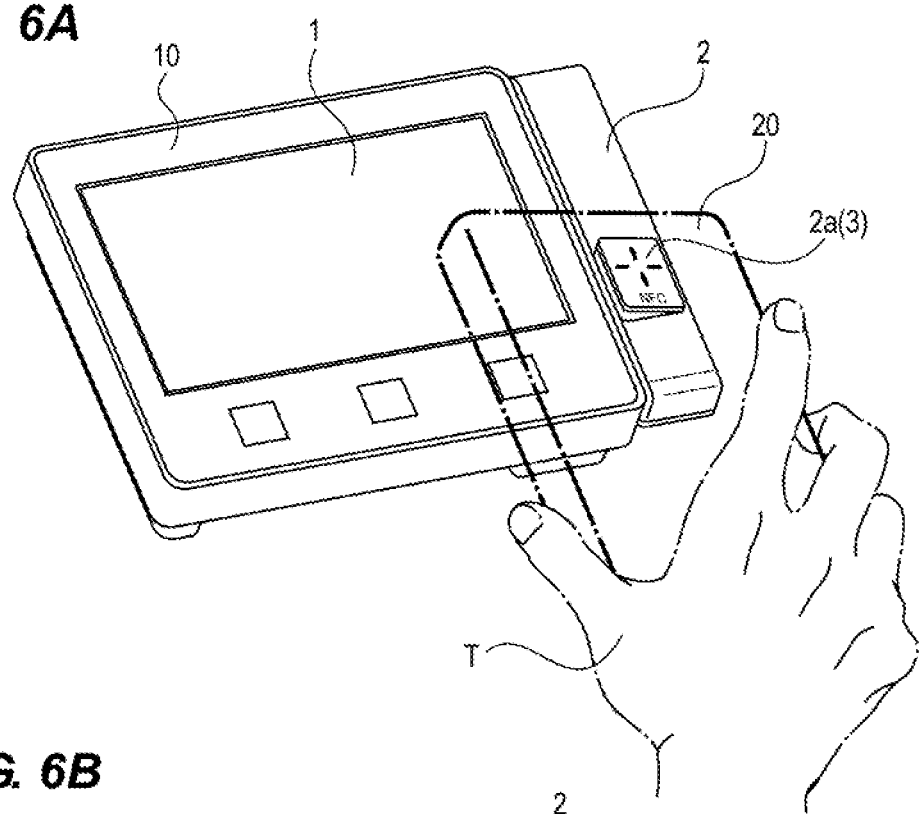
FIGS. 6A and 6B are perspective views illustrating a state in which an NFC is used for the operation portion according to the first embodiment.
Figure 6B:
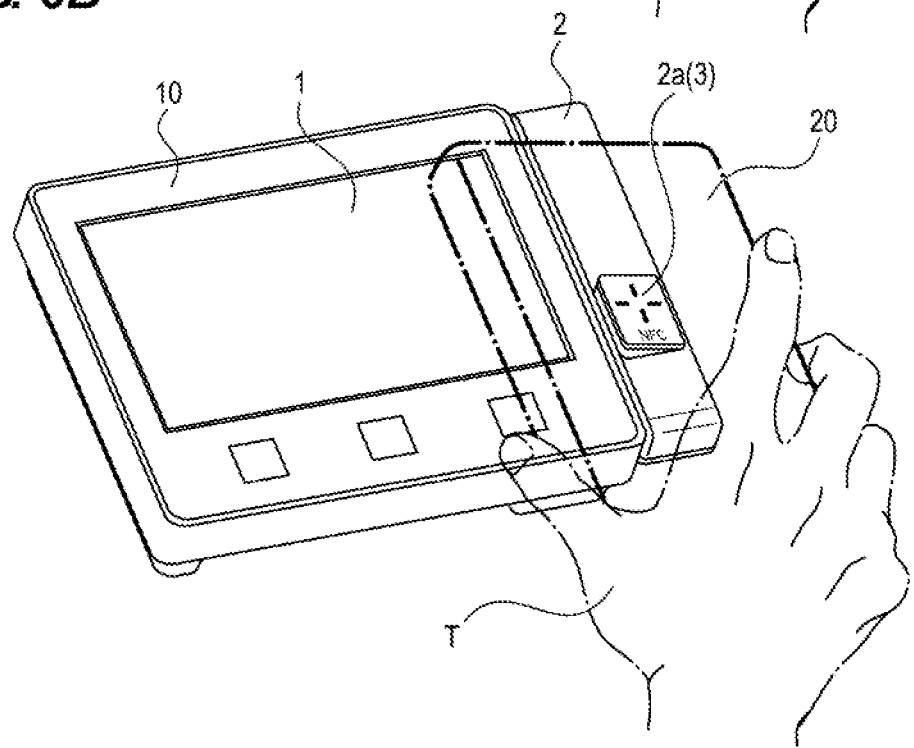

FIG. 3 is a front view of the outer appearance of the operation portion according to the first embodiment, FIG. 4 is a perspective view of the outer appearance of the operation portion, FIG. 5 is a sectional view of the operation portion, and FIGS. 6A and 6B are perspective views illustrating a state in which the NFC is used while the mobile device (the object to be detected) is brought close to the operation portion according to the first embodiment.

In the image forming apparatus according to the present embodiment, the detection position 2a for the NFC 3 is disposed on one side (right side as viewed from the front of the apparatus) of the touch panel 1 as viewed from the front of the apparatus. According to this configuration, an amount of projection of the operation portion 10 toward the front of the image forming apparatus main body 101 is suppressed. The detection position 2a for the NFC 3 is a detection surface facing the mobile device which is brought close to the operation portion 10 and serves as a target of near field communication. The detection position 2a serving as the detection surface is arranged to be adjacent to the touch panel 1 so that the mobile device (object to be detected) facing the detection position 2a overlaps the touch panel 1. In addition, the detection position 2a for the NFC 3 projects from the touch panel 1 with respect to the surface (the same as the surface of the touch panel 1) of the operation portion 10. In addition, the detection position (detection surface) 2a for the NFC 3 is inclined with respect to the panel surface of the touch panel 1 such that the distance between the mobile device overlapping the touch panel 1 and the touch panel 1 is larger than the distance between the mobile device facing the detection position 2a and the detection position 2a. Further, the detection position 2a for the NFC 3 is inclined with respect to the surface of the operation portion 10 such that the side close to the touch panel 1 is higher than the side distant from the touch panel 1. Specifically, the edge of the detection position (detection surface) 2a close to the touch panel projects more than the edge of the detection position 2a distant from the touch panel 1 in the normal direction of the panel surface of the touch panel 1. More specifically, the detection position 2a of the cover 2 corresponding to the NFC 3 is inclined so that the projection amount from the touch panel 1 on the side close to the touch panel 1 is about 5 mm and the projection amount from the touch panel 1 on the side distant from the touch panel 1 is about 0 to 1 mm. In the present embodiment, the detection position 2a for the NFC 3 is formed to be inclined while the surface thereof projects, that is, the detection position 2a is formed to be higher than the surface of the touch panel 1 by about 5 mm on the side close to the touch panel 1 (left side) and by about 0.5 mm on the side distant from the touch panel 1 (right side). According to this configuration, when the mobile device 20 is brought close to the detection position 2a for the NFC 3, the mobile device 20 can be guided to get close to the detection position 2a, which is the projecting surface and inclined surface of the cover 2, according to the shape of the detection position 2a. This configuration can prevent the mobile device 20 or the hand or finger holding the mobile device 20 from being touched on the touch panel 1. Note that the projection amount (5 mm in the present embodiment) of the edge of the detection position (detection surface) 2a, close to the touch panel, relative to the panel surface of the touch panel 1 is based on the lower limit of a communication distance determined by the standard of the near field communication.

As illustrated in FIGS. 3 and 4, when the user flicks on the screen of the touch panel 1 for page feed or the like, the user often moves his/her finger in the vertical direction or in the horizontal direction from the center of the touch panel 1. At that time, if the touch panel 1 has a small size such as 5 inches or lower, and the user flicks a finger Y in the direction of an arrow A from the center of the touch panel 1, the user moves his/her finger to the outside of the touch panel 1. For example, in the touch panel 1 of 5-inch size, the width of the screen is about 11 cm, and if the user flicks on the screen from the center thereof by 50 mm, the finger Y reaches the end of the screen. In the flick operation, the user still moves his/her finger on the position distant from the touch panel 1, so that the user is likely to touch on the projection shape of the detection position 2a for the NFC 3 arranged adjacent to the touch panel 1. The width of the screen of the 7-inch touch panel 1 is about 15 cm, and depending on the flick plus the amount of movement of the finger Y, the user is likely to touch on the projection shape of the detection position 2a for the NFC 3 arranged adjacent to the touch panel 1.

In view of this, the detection position 2a of the cover 2 corresponding to the NFC 3 is disposed on the position not in the vicinity of the centerline CL of the touch panel 1. Specifically, the detection position 2a for the NFC 3 is disposed in such a way that the upper end of the projection shape of the detection position 2a for the NFC 3 is separated from the centerline CL of the touch panel 1 by a distance B of 5 mm or more. In the present embodiment, the detection position 2a for the NFC 3 is disposed to be separated from the centerline CL of the touch panel 1 by the distance B which is 13 mm. This configuration can prevent the projection shape of the detection position 2a for the NFC 3 from interfering with the flick operation, whereby a sense of strangeness caused by the touch on the projection shape during the flick operation can be suppressed. Herein, the centerline CL of the touch panel 1 is a straight line (one-dot-chain line in FIG. 3) passing through the center C of the touch panel 1 in the horizontal direction.

As another flick operation, there is a case in which a starting point of the flick is determined by a layout of the screen. For example, it is the case in which, for line feed, the user touches the vicinity of the line to be moved and flicks on the screen. In the present embodiment, a touch panel screen for horizontal writing is used, and the left-aligned display is on the screen. Therefore, any location on the left side of the screen of the touch panel 1 becomes a starting point. The user flicks the screen vertically from this point, so that there is no chance that the user touches on the projection shape of the detection position 2a for the NFC 3 arranged on the right side of the touch panel 1.

On the other hand, when a touch panel screen for vertical writing is used, the starting point of the flick is on the inner side (upper side of the screen of the touch panel 1 in FIG. 3) of the screen. The user flicks the screen horizontally from the starting point. Therefore, the user does not touch on the projection shape of the detection position 2a for the NFC 3 arranged on the side (lower side of the screen of the touch panel 1 in FIG. 3) close to the front side with respect to the center of the touch panel 1. Note that, if the touch panel screen for vertical writing is used, the detection position 2a for the NFC 3 may be disposed on the front side (lower side of the screen of the touch panel 1 in FIG. 3) of the touch panel 1 in FIG. 3, not on the right side of the touch panel 1.

In addition, to make an access with the NFC 3, the user needs to hold the mobile device 20 within a predetermined distance from the NFC 3 (see FIG. 6). Therefore, as illustrated in FIGS. 3 and 4, the detection position 2a of the cover 2 corresponding to the NFC 3 is formed with a mark (cross mark) 2b for clearly indicating the detection position, as a mark over which the mobile device 20 is to be held. That is, the mark 2b indicates that the mobile device 20 needs to face this mark.

As illustrated in FIG. 5, the detection position 2a for the NFC 3 is provided to project from the touch panel 1 with respect to the top surface of the operation portion 10. In addition, the detection position 2a for the NFC 3 is inclined such that the projection amount from the touch panel 1 on the side (left side) close to the touch panel 1 is about 5 mm and the projection amount from the touch panel 1 on the side (right side) distant from the touch panel 1 is about 0.5 mm. According to this configuration, the distance from the NFC 3 (specifically, an NFC detection substrate having a detection portion) to the detection position 2a of the cover 2 corresponding to the NFC 3 is set as 5 mm or lower. This is to satisfy the lower limit of 5 mm in the detection standard of the NFC 3 of the mobile device 20.

The NFC 3 is disposed to be adjacent to the detection position 2a of the cover 2 facing the NFC 3 in a parallel manner, whereby the height of the detection position 2a for the NFC 3 can be set to be larger than 5 mm.

As illustrated in FIG. 6A, in the operation portion 10 having the detection position 2a for the NFC 3 disposed on the right side of the touch panel 1, the detection position 2a for the NFC 3 is disposed on the front side of the apparatus with respect to the center of the touch panel 1. Thus, the hand T holding the mobile device 20 is on the position outside of the touch panel 1, whereby misoperation by a finger or the like can be prevented.

As illustrated in FIG. 6B, even in the case in which a compact mobile device 20 (with a width of about 80 mm) held by the hand T is brought into touch with the detection position 2a for the NFC 3, the surface of the detection position 2a for the NFC 3 is inclined while projecting. Thus, the end of the mobile device 20 close to the touch panel is lifted from the surface of the touch panel 1 by a predetermined distance (here, about 15 mm), which prevents the finger from being accidentally in touch with the touch panel 1.

As described above, according to the present embodiment, when the user holds the mobile device 20 over the detection position 2a corresponding to the NFC 3, misoperation not intended by the user can be prevented, such as the touch of the edge of the mobile device or the fingers holding the mobile device on the touch panel.

Second Embodiment

An operation portion according to the second embodiment will be described with reference to FIG. 7. The schematic configuration of an image forming apparatus and the basic configuration of the operation portion are similar to those in the first embodiment described above, so that the description thereof will be omitted. In addition, in the present embodiment, the components functionally equivalent to those in the first embodiment are identified by the same reference marks.

In the present embodiment, a position different from the detection position 2a of the cover 2 corresponding to the NFC 3 is projected from the touch panel 1, and is inclined such that the side close to the touch panel 1 is higher than the side distant from the touch panel 1, as in the detection position.

Figure 7:
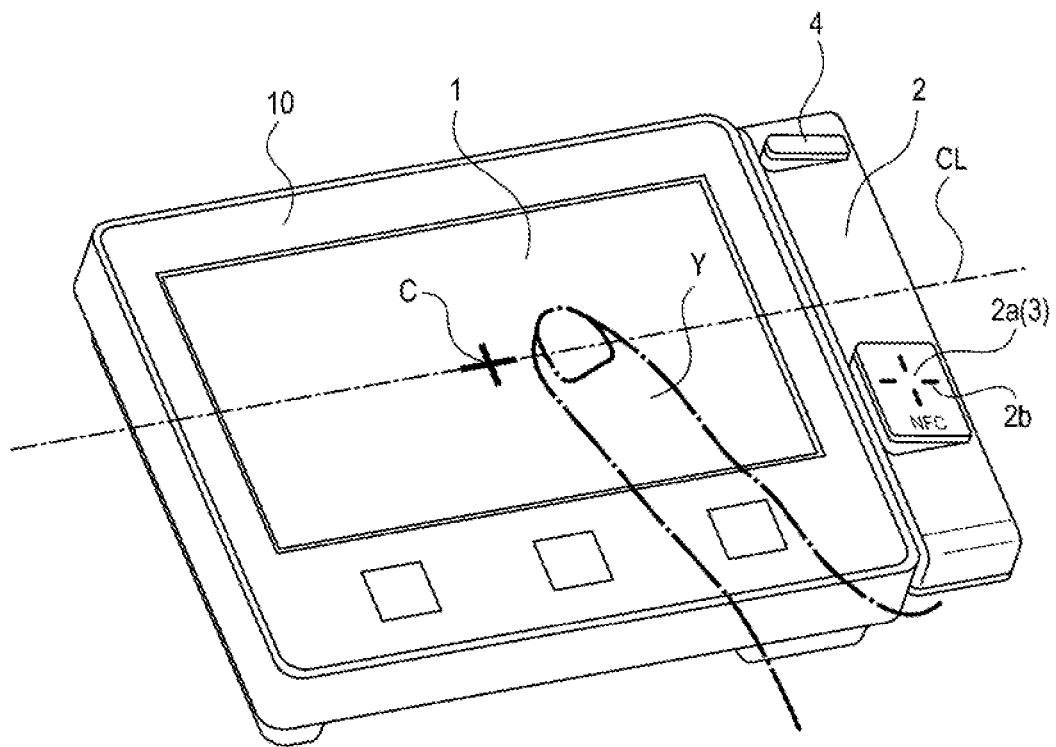
FIG. 7 is a perspective view of an outer appearance of an operation portion according to a second embodiment.

FIG. 7 is a perspective view of the outer appearance of the operation portion according to the second embodiment. In FIG. 7, a projection 4 is provided to have the same plane as the projecting inclined surface of the detection position 2a for the NFC. In contrast to the projection shape of the detection position 2a provided on the front side of the operation portion 10 with respect to the centerline CL of the touch panel 1, the projection 4 is provided on the inner side of the operation portion 10 with respect to the centerline CL of the touch panel 1.

If a large-sized tablet is used as the mobile device, the operation portion 10 may be difficult to be visible depending on the position of the NFC of the tablet. In this case, the inner side of the tablet is in touch with the touch panel 1 because the inner side of the tablet becomes lower than the front side with respect to the operation portion 10, for example, resulting in that misdetection might be caused.

In view of this, in the present embodiment, the above-mentioned projection 4 is provided on the inner side of the operation portion 10, separately from the detection position 2a for the NFC 3 provided on the front side of the operation portion 10. According to this configuration, the projection 4 is first in touch with the tablet and receives the tablet on the inner side of the operation portion 10. Therefore, when the user brings the tablet close to the detection position 2a for the NFC with this state, the tablet can be received by two positions, the detection position 2a and the projection 4. Thus, misoperation on the touch panel 1 can be prevented, even if a large-sized tablet is used as the mobile device 20.

In addition, the projection 4 is formed on the position distant from the centerline CL of the touch panel 1 by 5 mm or more (in the present embodiment, 30 mm). Therefore, the projection 4 does not interfere with the flick operation when the user operates the touch panel 1.

Third Embodiment

An operation portion according to the third embodiment will be described with reference to FIG. 8. The schematic configuration of an image forming apparatus and the basic configuration of the operation portion are similar to those in the first embodiment described above, so that the description thereof will be omitted. In addition, in the present embodiment, the components functionally equivalent to those in the first embodiment are identified by the same reference marks.

In the first and second embodiments described above, the detection position 2a for the NFC 3 and the projection 4 are disposed on the position not interfering with the flick operation when the user operates the touch panel 1, in consideration of the case in which the touch panel 1 has relatively a small size. However, the present invention is not limited thereto.

Figure 8:
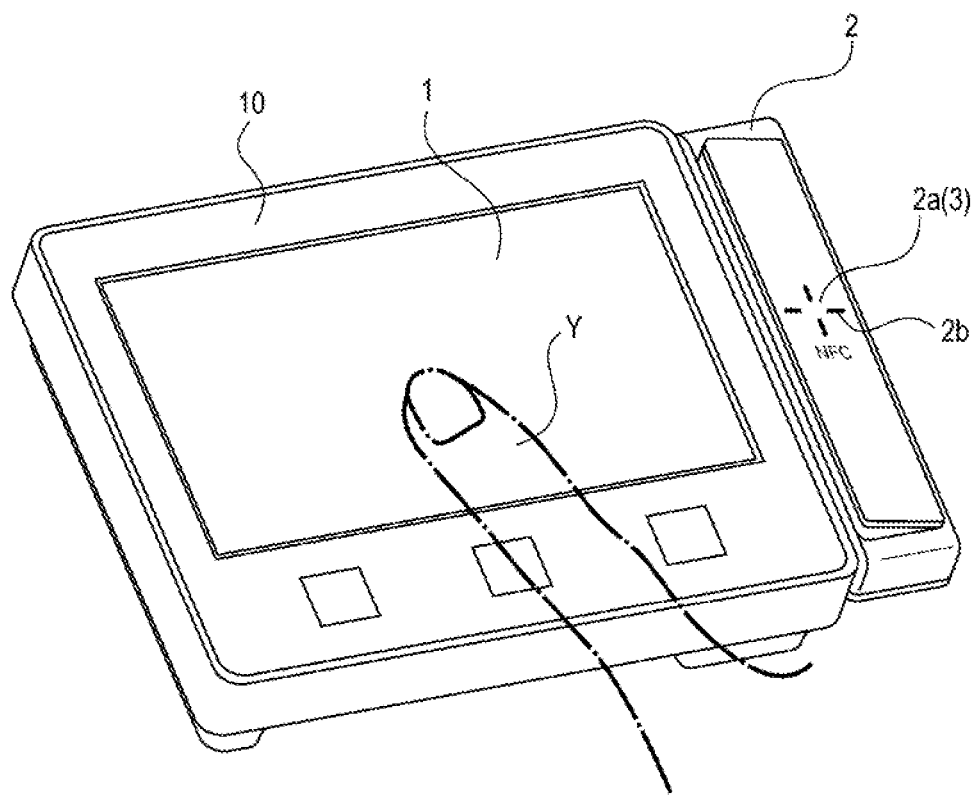
FIG. 8 is a perspective view of an outer appearance of an operation portion according to a third embodiment.

FIG. 8 is a perspective view of the appearance of the operation portion according to the third embodiment. In the operation portion 10 illustrated in FIG. 8, the touch panel 1 has a size large enough relative to the flick operation. In this case, the projection shape of the detection position 2a of the cover 2 corresponding to the NFC 3 may be provided entirely, not partially, on the right side, as illustrated in FIG. 8.

When the touch panel 1 has a size large enough relative to the flick operation as described above, the projection shape of the detection position 2a corresponding to the NFC 3 does not interfere with the flick operation, even if the projection shape is provided entirely on the right side, and further, accidental misoperation upon the detection by the NFC can be prevented.

Fourth Embodiment

An operation portion according to the fourth embodiment will be described with reference to FIGS. 9 and 10. The schematic configuration of an image forming apparatus and the basic configuration of the operation portion are similar to those in the first embodiment described above, so that the description thereof will be omitted. In addition, in the present embodiment, the components functionally equivalent to those in the above-mentioned embodiments are identified by the same reference marks.

The above-mentioned embodiments have described the configuration in which the operation portion 10 does not have an information input unit except for the touch panel. However, the configuration is not limited thereto. As illustrated in FIG. 9, the operation portion 10 according to the present embodiment includes various keys such as a tenkey 40 and a start key 41 as an information unit except for the touch panel.

Meanwhile, the mounting size of the touch panel 1 to the image forming apparatus has gradually been increased, starting with an apparatus that can output a large-sized sheet such as an A3 sheet, and a touch panel with 10-inch or greater diagonal is not uncommon. The touch panel 1 in FIG. 9 has 10-inch size, and is provided with various keys described above on the right side.

Figure 9:
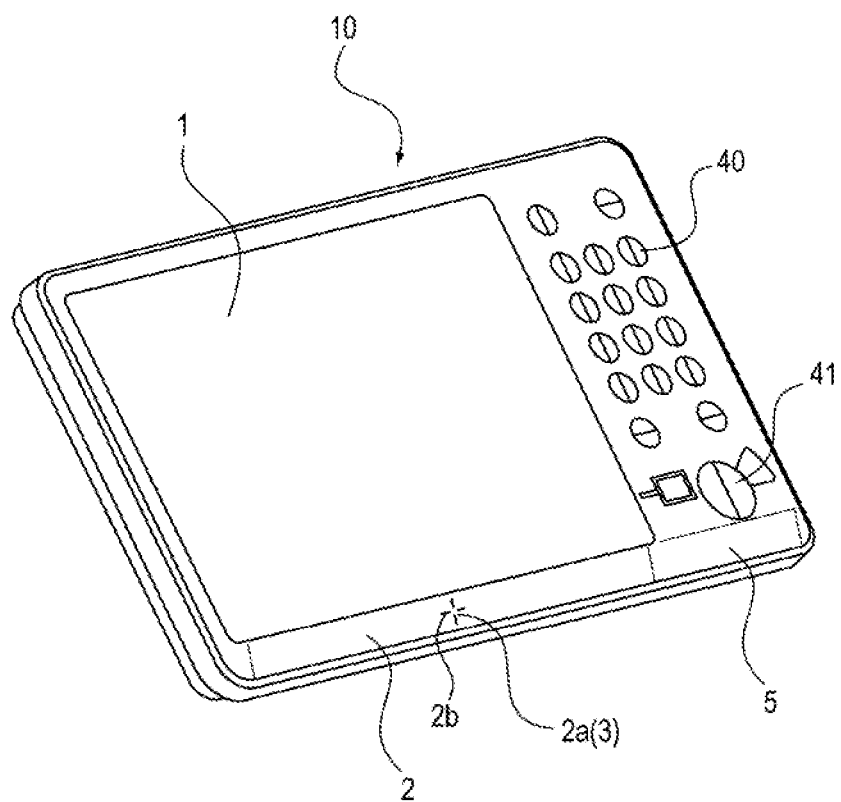
FIG. 9 is a perspective view of an outer appearance of an operation portion according to a fourth embodiment.

As illustrated in FIG. 9, in order to prevent the horizontal size of the touch panel 1 from being further increased, the NFC 3 is disposed on the near side (front side) of the touch panel 1, out of the locations around the touch panel 1, in the operation portion 10 according to the present embodiment. Specifically, the detection position 2a of the cover 2 for the NFC 3 is provided not on the right or left of the touch panel 1, but on the near side of the touch panel 1.

While the detection range of the mobile device 20 by the NFC 3 may be wide such as about 100 mm as used for an automatic ticket gate for railways, the detection range of the operation portion 10 in the present embodiment is about 20 mm, in consideration of balance among function, cost, and size. Therefore, to make an access with the NFC, the user needs to bring the mobile device close to the touch panel 1 and hold the mobile device over the touch panel 1 so that the mobile device falls within this range.

Figure 10A:
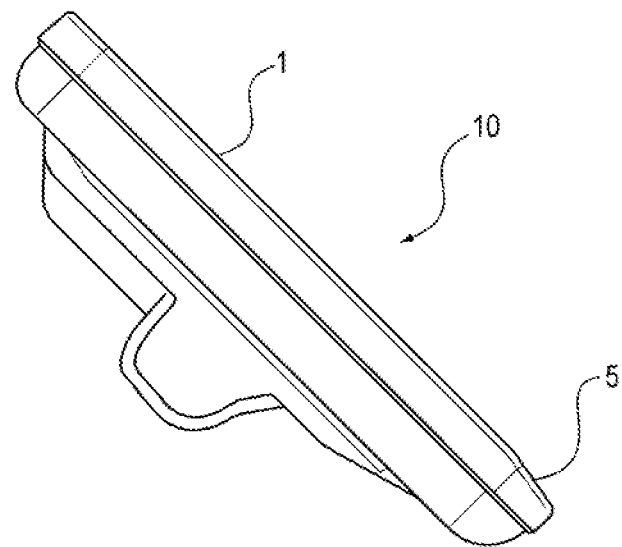
FIGS. 10A and 10B are side views illustrating a detection example of an NFC in the operation portion according to the fourth embodiment.
Figure 10B:
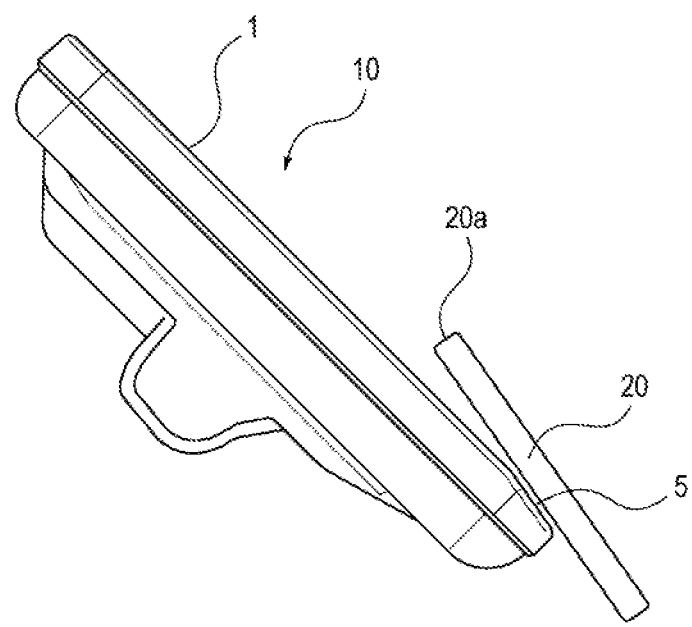

FIG. 9 is a perspective view of an appearance of the operation portion 10 according to the fourth embodiment, and FIGS. 10A and 10B are side views of the operation portion 10 according to the fourth embodiment.

As illustrated in FIG. 9, in the operation portion 10 according to the present embodiment, the detection position 2a of the cover 2 corresponding to the NFC 3 is provided on the near side of the touch panel 1. In addition, the detection position 2a of the cover 2 corresponding to the NFC 3 is inclined such that the side close to the touch panel is higher than the side distant from the touch panel 1. Specifically, an inclined surface 5 having a predetermined angle relative to the surface of the touch panel 1 is formed on the detection position 2a of the cover 2 corresponding to the NFC 3. This inclined surface 5 is formed on the entire horizontal width of the touch panel 1 on the near side.

In addition, to make an access with the NFC, the user needs to hold the mobile device 20 within a predetermined distance from the NFC 3. Therefore, as illustrated in FIG. 9, the detection position 2a of the cover 2 corresponding to the NFC 3 is formed with a mark (cross mark) 2b for clearly indicating the detection position, as a mark over which the mobile device 20 is to be held.

When the user holds the mobile device 20 over the mark 2b on the operation portion 10, an effect of leading the user to hold the mobile device 20 over the inclined surface 5 including the detection position 2a in a parallel manner can be expected. The inclined surface 5 has an angle by which the side close to the touch panel 1 is high. Therefore, if the user holds the mobile device 20 over the inclined surface 5 or allows the mobile device 20 to abut on the inclined surface 5 in a parallel manner, the end 20a of the mobile device 20 close to the touch panel 1 is naturally lifted up. FIG. 10B illustrates the mobile device 20 in the state of abutting on the mark 2b (see FIG. 9) on the inclined surface 5, and it is understood from this figure that the end 20a of the mobile device 20 is led in the direction away from the touch panel 1.

As described above, due to the formation of the inclined surface 5, the present embodiment provides an effect of reducing misoperation on the touch panel 1 by the mobile device 20 at low cost and with a simple configuration without entailing an increase in cost for the input device including the operation portion and degrading design.

Note that the inclined surface 5 is not necessarily provided on the entire horizontal width of the operation portion 10. The configuration in which the inclined surface 5 is partially provided can also provide the effect of reducing misoperation on the screen, so long as the inclined surface 5 is provided in a region larger than the horizontal width of the mobile device 20.

Fifth Embodiment

An operation portion according to the fifth embodiment will be described with reference to FIGS. 11 and 12. The schematic configuration of an image forming apparatus and the basic configuration of the operation portion are similar to those in the first embodiment described above, so that the description thereof will be omitted. In addition, in the present embodiment, the components functionally equivalent to those in the above-mentioned embodiments are identified by the same reference marks.

Figure 11:
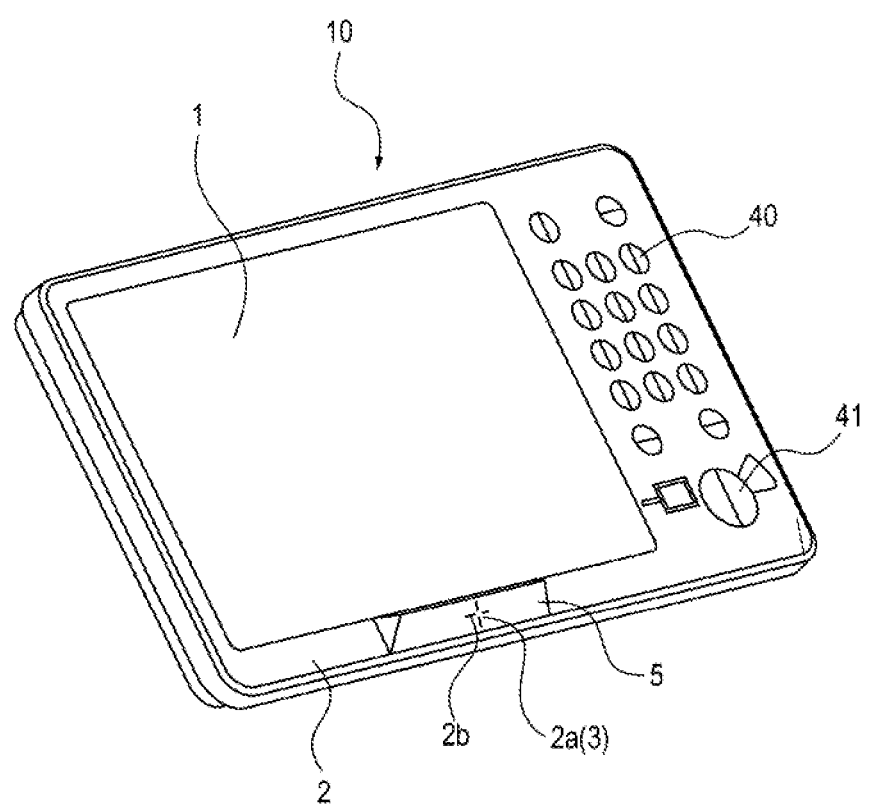
FIG. 11 is a perspective view of an outer appearance of an operation portion according to a fifth embodiment.
Figure 12A:
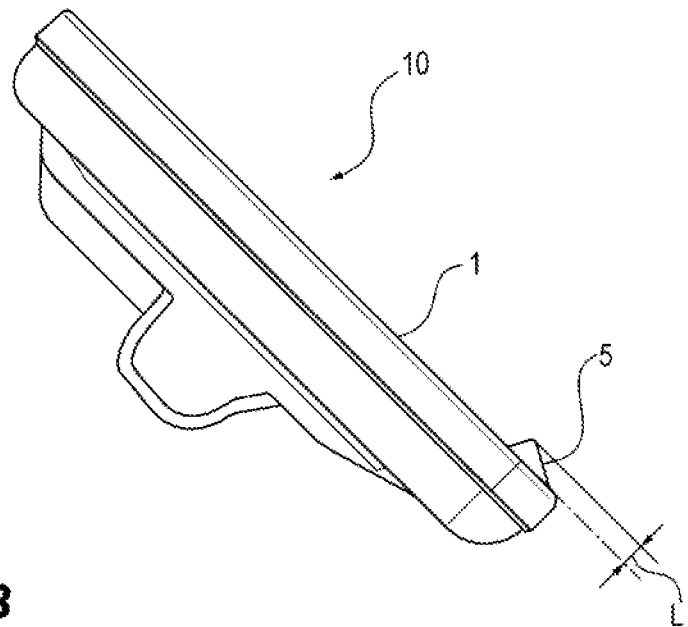
FIGS. 12A and 12B are side views illustrating a detection example of an NFC in the operation portion according to the fifth embodiment.
Figure 12B:
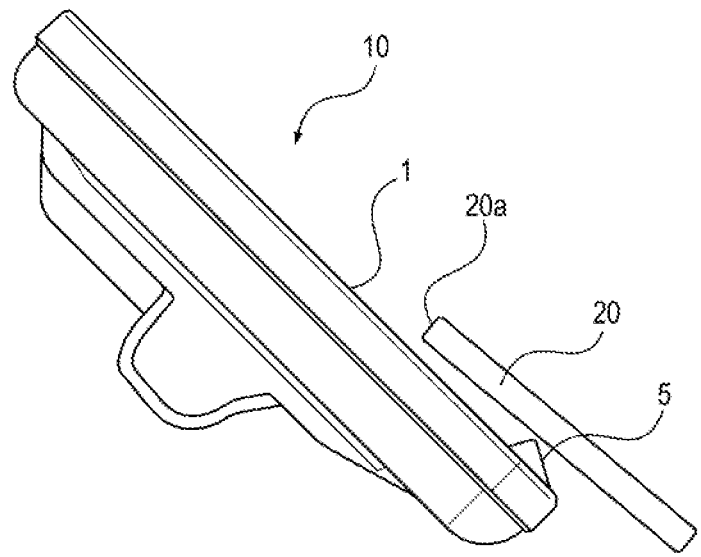

FIG. 11 is a perspective view of an appearance of the operation portion 10 according to the fifth embodiment, and FIGS. 12A and 12B are side views of the operation portion 10 according to the fifth embodiment.

As in the operation portion 10 in the fourth embodiment described above, in the operation portion 10 in the present embodiment, the detection position 2a of the cover 2 corresponding to the NFC 3 is provided on the near side of the touch panel 1 as illustrated in FIG. 11. In addition, the detection position 2a of the cover 2 corresponding to the NFC 3 is inclined such that the side close to the touch panel is higher than the side distant from the touch panel 1. Specifically, an inclined surface 5 having a predetermined angle relative to the surface of the touch panel 1 is formed on the detection position 2a of the cover 2 corresponding to the NFC 3. Further, as illustrated in FIGS. 12A and 12B, this inclined surface 5 is a projecting inclined surface projecting from the surface of the cover 2, which is substantially the same as the surface of the touch panel 1, by a predetermined amount (projection amount) L.

In addition, as in the embodiment described above, the detection position 2a of the cover 2 corresponding to the NFC 3 is formed with a mark (cross mark) 2b for clearly indicating the detection position, as a mark over which the mobile device 20 is to be held, as illustrated in FIG. 11.

When the user holds the mobile device 20 over the mark 2b on the operation portion 10, an effect of leading the user to hold the mobile device 20 over the projecting inclined surface 5 including the detection position 2a in a parallel manner can be expected. The projecting inclined surface 5 has an angle by which the side close to the touch panel 1 is high. Therefore, if the user holds the mobile device 20 over the projecting inclined surface 5 or allows the mobile device 20 to abut on the projecting inclined surface 5 in a parallel manner, the end 20a of the mobile device 20 close to the touch panel 1 is naturally lifted up.

In addition, an inclined surface 5 in the present embodiment projects from the surface of the cover 2 in a predetermined amount (projection amount) L. Therefore, as illustrated in FIG. 12B, when the user holds the mobile device 20 over the mark 2b, the mobile device 20 abuts on the inclined surface 5 before abutting on the touch panel 1. Thus, the contact of the mobile device 20 with the touch panel 1 can be prevented. Specifically, due to this projection amount L, the effect of preventing the contact of the mobile device 20 with the touch panel 1 can more positively be obtained.

Notably, the larger the projection amount L is, the more the effect of preventing the misoperation on the screen of the touch panel 1 is obtained. However, the projection amount L is not increased unlimitedly. Considering that the detection range of the mobile device 20 by the NFC 3 is about 20 mm, if the projection amount L exceeds 20 mm, the detection of the mobile device 20 cannot be achieved. Therefore, in the light of the balance between the effect of preventing misoperation and the detection range, the projection amount L is preferably 10 mm or less, and in the present embodiment (FIGS. 11 and 12), it is 5 mm.

As described above, due to the formation of the projecting inclined surface 5, the present embodiment provides an effect of reducing misoperation on the touch panel 1 by the mobile device 20 at low cost and with a simple configuration without entailing an increase in cost for the input device including the operation portion and degrading design.

Note that the horizontal size of the projecting inclined surface 5 may be smaller than the horizontal size of the mobile device 20, or may be equal to the entire horizontal size of the operation portion 10. This is because, if the projection amount L is equal, the effect of reducing the misoperation is not so different.

In addition, the projecting inclined surface 5, which is the portion of the detection position 2a of the cover 2 corresponding to the NFC 3, is not necessarily formed integral with the surface 30 of the cover 2 on the operation portion 10, and may be configured to be detachably attached to the operation portion 10.

Other Embodiments

While a resistive (pressure-sensitive) touch panel that converts a physical contact on a panel surface into electric information is employed as a touch panel in the embodiments described above, the touch panel is not limited thereto. A capacitance touch panel that detects a small electric signal from a hand or a finger touched on the panel surface may be used.

In addition, other image forming apparatus such as a printer, a copying machine, and a facsimile device, or other image forming apparatus such as a multifunction peripheral having these functions may be used as an image forming apparatus. When the present invention is applied to an input device used for these image forming apparatuses, the similar effect can be obtained.

The present invention can prevent accidental misoperation on the touch panel due to a contact between a mobile device or a user's hand holding the mobile device and the touch panel, during communication with the mobile device via near field communication.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-087223, filed Apr. 25, 2016, which is hereby incorporated by reference herein in its entirety.

What is claimed is:

1. An image forming apparatus comprising:
   an image forming apparatus main body configured to form an image on a sheet; and
   an operation portion disposed at a front side of the image forming apparatus main body in a front-rear direction of the image forming apparatus main body, the operation portion being rotatable with respect to the image forming apparatus main body, the operation portion including:
   a near field communication portion configured to establish a near field communication and configured to communicate with a mobile device by the near field communication;
   a touch panel configured to receive an instruction from a user via a touching operation; and
   a cover portion, wherein the cover portion is provided with a mark as a target over which the mobile device is to be held to establish the near field communication,
   wherein the mark (i) is positioned below a centerline that elongates in a width direction that is perpendicular to a vertical direction and the front-rear direction and passes through a center of the touch panel, and (ii) is positioned between a right edge of the cover portion and a right edge of the touch panel in the width direction when the operation portion is viewed in a direction perpendicular to a plane of the touch panel.

2. The image forming apparatus according to claim 1, wherein the cover portion covers the near field communication portion.

3. The image forming apparatus according to claim 1, wherein the cover portion includes a detection surface portion on which the mark is formed, and the detection surface portion is projected in a thickness direction of the touch panel.

4. The image forming apparatus according to claim 3, wherein a projection amount of the detection surface portion at a near side to the touch panel is larger than a projection amount of the detection surface portion at a far side to the touch panel.

5. The image forming apparatus according to claim 4, wherein the detection surface portion is inclined with respect to the panel surface of the touch panel.

6. The image forming apparatus according to claim 1, further comprising a front cover portion that is disposed on the front side of the image forming apparatus,
   wherein the operation portion is disposed above the front cover portion in the vertical direction.

7. The image forming apparatus according to claim 1, further comprising a sheet discharge portion that is disposed on the image forming apparatus main body and discharges the sheet on which an image is formed,
   wherein the operation portion is disposed above the sheet discharge portion in the vertical direction.

8. The image forming apparatus according to claim 1, further comprising a storage portion that stores the sheet,
   wherein the operation portion is disposed above the storage portion in the vertical direction.

9. The image forming apparatus according to claim 1, further comprising an image reading portion that is disposed above the image forming apparatus in the vertical direction and is configured to read an image on the sheet,
   wherein the operation portion is disposed more towards the front side than the image reading portion in the front-rear direction.

* * * * *